US010575345B2

(12) United States Patent
Montemurro et al.

(10) Patent No.: US 10,575,345 B2
(45) Date of Patent: Feb. 25, 2020

(54) APPARATUS AND METHOD FOR ESTABLISHING A CONNECTION BETWEEN NODES OF A WIRELESS NETWORK

(71) Applicant: BlackBerry Limited, Waterloo (CA)

(72) Inventors: Michael Peter Montemurro, Toronto (CA); Claude Jean-Frederic Arzelier, Molieres-sur-Ceze (FR)

(73) Assignee: BlackBerry Limited, Waterloo (CA)

( * ) Notice: Subject to any disclaimer, the term of this patent is extended or adjusted under 35 U.S.C. 154(b) by 72 days.

(21) Appl. No.: 15/940,291

(22) Filed: Mar. 29, 2018

(65) Prior Publication Data

US 2019/0306897 A1 Oct. 3, 2019

(51) Int. Cl.
*H04W 76/10* (2018.01)
*H04W 72/04* (2009.01)
*H04L 5/00* (2006.01)

(52) U.S. Cl.
CPC .......... *H04W 76/10* (2018.02); *H04L 5/0055* (2013.01); *H04W 72/0446* (2013.01)

(58) Field of Classification Search
CPC .. H04W 76/10; H04W 72/0446; H04L 5/0055
See application file for complete search history.

(56) References Cited

U.S. PATENT DOCUMENTS

| 8,761,084 | B2  | 6/2014  | Pandey et al. |
| 9,596,650 | B2  | 3/2017  | Bradley |
| 2006/0269028 | A1 | 11/2006 | Bley et al. |
| 2013/0028293 | A1* | 1/2013 | Makh ................... H04W 48/12 375/132 |
| 2016/0212704 | A1* | 7/2016 | Matsunaga ....... H04W 52/0216 |

OTHER PUBLICATIONS

European Patent Application No. 18305365.1, Extended European Search Report dated Sep. 19, 2018.

* cited by examiner

*Primary Examiner* — Melvin C Marcelo
(74) *Attorney, Agent, or Firm* — Borden Ladner Gervais LLP; Todd Keeler

(57) ABSTRACT

A method and apparatus for a first node to establish a wireless connection with a second node includes determining a reception time period of the second node during which a radio of the second node is turned on to receive signals, and an interval time period between commencement of reception periods of the second node, determining an event, in response to determining the event, transmitting a message to the second node a predetermined number of times, wherein a first time between transmission of the message is substantially equal to the reception time period, and the predetermined number of times that the message is transmitted is a positive integer that is equal to a quotient of the interval time period divided by the first time, rounded up to the next larger positive integer if the quotient includes a remainder.

20 Claims, 3 Drawing Sheets

APPARATUS AND METHOD FOR ESTABLISHING A CONNECTION BETWEEN NODES OF A WIRELESS NETWORK

FIELD

The present disclosure relates to establishing a connection between nodes of a wireless network.

BACKGROUND

Networks of wireless devices, or wireless nodes, have become more prevalent with the growth of the so called internet of things (IOT). Often the nodes included in such networks are battery powered. As smaller and smaller nodes are desired, the size of the battery, and thus the available power, of the node may also be decreased. Because radio transmission of nodes in a wireless network is power intensive, nodes generally have their radios turned off for a majority of the time, referred to as a sleep state, in order to save power. The nodes may periodically turn their radios on for a brief period, referred to as an awake state, to transmit data and listen for signals transmitted by other nodes in the network.

Nodes in wireless networks may attempt to synchronize their schedules of awake and sleep states such that the nodes are able to transmit and receive signals to each other efficiently while remaining in the sleep state for the majority of the time, and thus reducing overall power consumption. However, in instances in which a node has not yet synchronized with other nodes in the network or has become asynchronous with other nodes in the network that node will need to establish a connection with one or more other nodes in the network.

Improvements in establishing connections between nodes in a wireless network are desirable.

BRIEF DESCRIPTION OF THE DRAWINGS

Embodiments of the present disclosure will now be described, by way of example only, with reference to the attached Figures.

DETAILED DESCRIPTION

Figure 1:
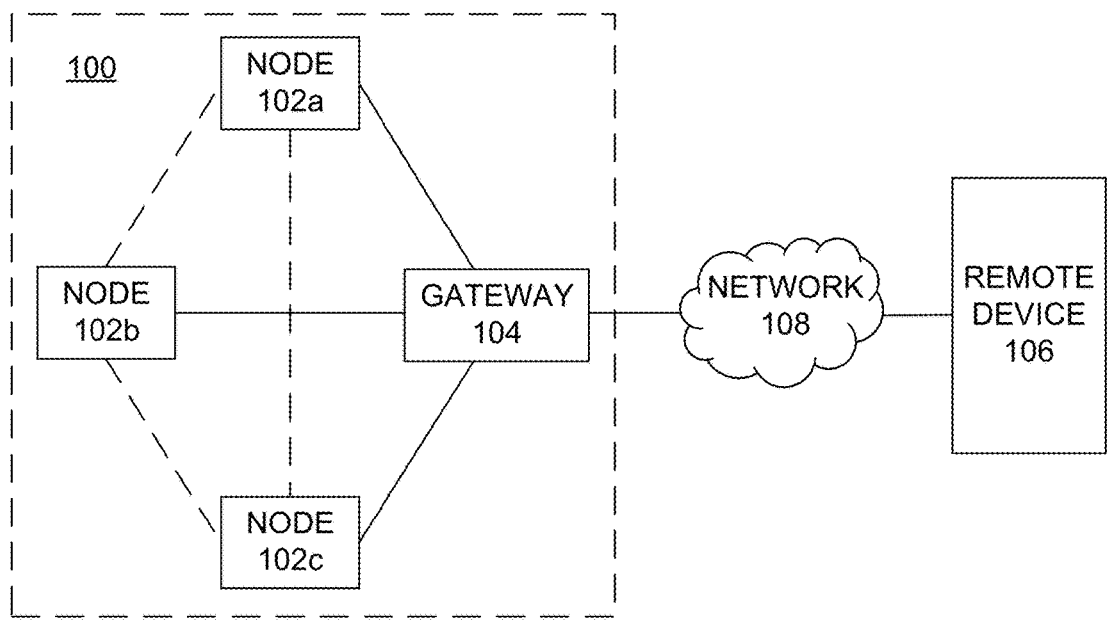
FIG. 1 is a block diagram of an example wireless node network in accordance with the present disclosure.

The present disclosure provides a system and method for establishing a connection between a transmitting node and a receiving node. According to the present disclosure, the transmitting node transmits a message a predetermined number of times, with the time period between sequential transmissions being equal to the reception time period of the receiving node. The predetermined number of transmissions is selected such that the time period over which the transmitting node is transmitting the messages is at least as long as the interval time period of the receiving node.

The method for establishing a connection may be utilized for nodes that are not yet linked, in which case the connection is being established for the time, or for nodes that are lined, or have previously been linked, and have previously communicated with one another and establishing a connection is for facilitating further communication.

The present disclosure may be utilized, for example, to establish a connection between nodes that are not synchronized due to, for example, one of the nodes being added to the network and not yet established a first connected to the other node of the network, or due to clock drift in one or both of the nodes.

In an embodiment, the present disclosure provides a method for a first node to establish a wireless connection with a second node that includes determining a reception time period of the second node during which a radio of the second node is turned on to receive signals, and an interval time period between commencement of reception periods of the second node, determining an event, in response to determining the event, transmitting a message to the second node a predetermined number of times, wherein a first time between transmission of the message is substantially equal to the reception time period, and the predetermined number of times that the message is transmitted is a positive integer that is equal to a quotient of the interval time period divided by the first time, rounded up to the next larger positive integer if the quotient includes a remainder.

In an example embodiment, the method includes receiving an acknowledgement message from the second node.

In an example embodiment, the acknowledgement message includes an update to one of the reception time period, the interval time period, and the predetermined number of times for transmitting the message.

In an example embodiment, one of the time of sending of the acknowledgement message by the second node and time of receiving the acknowledgement message at the first node is used by the first node as a reference starting time for the interval time period.

In an example embodiment, the method includes, in response to receiving the acknowledgement message prior to transmitting the message the predetermined number of times, stopping further transmission of the message such that the message is transmitted fewer than the predetermined number of times.

In an example embodiment, the message includes an update to one of the reception time period, the interval time period, and the predetermined number of times for transmitting the message.

In an example embodiment, transmitting a message to the second node a predetermined number of times comprises transmitting a sequence of messages, each message of the sequence of messages includes an indicator of a place of that message in the sequence, and determining the event comprises determining that a time since commencing transmitting a previous sequence of messages meets a sequence time period such that the sequence of messages are periodically transmitted, the method further includes, in response to receiving the message transmitted by the first node, the second node determining the place of the received message in the sequence of messages and the third time duration, and adjusting a second time until a next reception time period of the second node based on the indicator of the place of the received message within the sequence and the sequence time period such that a middle of the next reception time period is aligned with a middle message of the sequence of messages during a subsequent transmission.

In an example embodiment, each message of the sequence of messages indicates the sequence time period.

In an example embodiment, the first node comprises a sensor, and determining the event comprises at least one of the sensor making a measurement, a loss of synchronization between the first node and the second node, a reset of the node.

In another embodiment, the present disclosure provides a wireless node that includes a first radio, a processor in communication with the first radio and configured to determine a reception time period of a second node during which a second radio of the second node is turned on to receive signals, and an interval time period between commencement of reception periods of the second node, determine an event, and in response to determining the event, transmit a message to the second node a predetermined number of times, wherein a first time between transmission of the message is substantially equal to the reception time period, and the predetermined number of times that the message is transmitted is a positive integer that is equal to a quotient of the interval time period divided by the first time, rounded up to the next larger positive integer if the quotient includes a remainder.

In an example embodiment, the processor is further configured to receive an acknowledgement message from the second node.

In an example embodiment, the acknowledgement message includes an update to one of the reception time period, the interval time period, and the predetermined number of times for transmitting the message.

In an example embodiment, one of a transmission time of sending the acknowledgement message by the second node and receiving time of receiving the acknowledgement message at the radio of the wireless node is used by the node as a reference starting time for the interval time period.

In an example embodiment, the processor is further configured to, in response to receiving the acknowledgement message prior to transmitting all of the predetermined number of messages, stopping further transmission of the messages such that fewer than the predetermined number of messages are transmitted.

In an example embodiment, the message includes an update to one of the reception time period, the interval time period, and the predetermined number of times for transmitting the message.

In an example embodiment, the wireless node includes a sensor in communication with the processor, and determining the event comprises at least one of the sensor making a measurement, a loss of synchronization between the node and the gateway, a reset of the node.

In another embodiment, the present disclosure provides a wireless system that includes a second that includes a second radio, and a second processor in communication with the second radio and configured to periodically turn on the second radio for a reception time period, wherein commencement of reception time periods are separated by a interval time period, a first node that includes a first radio, and a first processor in communication with the first radio and configured to determine the reception time period and the interval time period of the second node, determine an event, in response to determining the event, transmit a message to the second node a predetermined number of times, wherein a first time between transmission of the message is equal to the reception time period, and the predetermined number of times that the message is transmitted is a positive integer that is equal to a quotient of the interval time period divided by the reception time period, rounded up to the next larger positive integer if the quotient includes a remainder.

In an example, embodiment, the second node further includes a battery and the second processor is further configured to determine at least one of the reception time period and the interval time period based on an estimated power consumption of the second node and a power level of the battery.

In an example embodiment, transmitting a message to the second node a predetermined number of times comprises transmitting a sequence of messages, each message of the sequence of messages includes an indicator of a place of that message in the sequence, and determining the event comprises determining that a time since commencing transmitting a previous sequence of messages meets a sequence time period such that the sequence of messages are periodically transmitted, the second processor further configured to in response to receiving the message transmitted by the first node, determine the place of the received message in the sequence of messages and the third time duration, and adjust a second time until a next reception time period of the second node based on the indicator of the place of the received message within the sequence and the sequence time period such that a middle of the next reception time period is aligned with a middle message of the sequence of messages during a subsequent transmission of the sequence of messages by the first node.

In an example embodiment, each message of the sequence of messages indicates the sequence time period.

In another embodiment, the present disclosure provides a computer-readable medium having stored thereon a computer-readable code executable by a processor of a first node to cause the processor to determine a reception time period of a second node during which a radio of the second node is turned on to receive signals, and an interval time period between commencement of reception periods of the second node, determine an event, in response to determining the event, transmit a message to the second node a predetermined number of times, wherein a first time between transmission of the message is substantially equal to the reception time period, and the predetermined number of times that the message is transmitted is a positive integer that is equal to a quotient of the interval time period divided by the first time, rounded up to the next larger positive integer if the quotient includes a remainder.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described.

FIG. 1 is a schematic diagram of an example wireless node network 100. The example wireless node network 100 includes a number of nodes 102a to 102c and a gateway 104. Each node 102a to 102c may establish wireless connections with the gateway 104, as indicated by the solid lines, to facilitate transmitting data to and receiving data from the gateway 104.

Additionally, or alternatively, each node 102a to 102c may establish wireless connections with one or more of the other nodes 102a to 102c of the wireless node network 100, as indicated by the dashed lines, to facilitate transmitting data to and receiving data from the other nodes 102a to 102c, forming what is known as a meshed network. In this example, a node 102a to 102c may communicate with the gateway 104 via one or more other nodes 102a to 102c which act as an intermediary, rather than the node 102a to 102c transmitting data to the gateway 104 directly. For example, node 102a may transmit data to the gateway 104 by first transmitting the data to the node 102b, which then transmits that data onto to the gateway 104. Similarly, in this example, the gateway 104 may transmit data to the node 102a by first transmitting that data to the node 102b, which then transmits the data onto the node 102a.

Although the example wireless node network 100 shown in FIG. 1 includes three nodes 102a to 102c and one gateway 104, the network 100 include a greater or a fewer number of nodes 102a to 102c and more than one gateway 104.

The nodes 102a to 102c and the gateway 104 may utilize any suitable wireless communication protocol to transmit and receive data with each other. For example, the nodes 102a to 102c and the gateway 104 may utilize a short-range wireless communication protocol such as, for example, Bluetooth®, IEEE 802.15.4, WiFi®, or Zigbee®. In another example, nodes 102a to 102c and the gateway 104 may utilize other suitable radio technologies based on, for example, CDMA2000, 3GPP GERAN, 3GPP UTRAN, 3GPP E-UTRAN (LTE) or 3GPP 5G. The nodes 102a to 102c and the gateway 104 may communicate with each other utilizing network-to-device radio links or device-to-device radio links such as 3GPP Proximity-based services (ProSe) making use of a PC5 interface, or a combination of network-to-device and device-to-device radio links.

The gateway 104 may transmit data received from the nodes 102a to 102c to, for example, a remote device 106. The remote device 106 may be, for example, a server or any other electronic device. Examples of electronic devices include mobile, or handheld, wireless communication devices such as cellular phones, cellular smart-phones, wireless organizers, personal digital assistants, computers, tablet computers, mobile internet devices, electronic navigation devices, and so forth.

The gateway 104 may transmit data to the remote device 106 via a network 108. The network 108 may be any suitable wired or wireless network, or combination of wired and wireless networks including, for example, a local area network (LAN), or a wide area network (WAN), or a combination thereof. Wireless communication between the gateway 104 and the network 108 may utilize any suitable short-range wireless communication protocol, as described above, or any utilize any suitable cellular communication protocol including, for example, CDMA2000, 3GPP GERAN, 3GPP UTRAN, 3GPP E-UTRAN (LTE) or 3GPP 5G.

The gateway 104 may be, for example, functionally similar to the other nodes 102a to 102c of the wireless node network but with the additional functionality of transmitting data collected from the nodes 102a to 102c to the remote device 106 via the network 108, and to transmit data received from the remote device 106 to the nodes 102a to 102c.

The nodes 102a to 102c may be any type of wireless device that is suitable for transmitting data to and receives data from other the nodes 102a to 102c and the gateway 104 of the wireless node network 100. In an example, one or more of the nodes 102a to 102c may include, for example, sensors that are utilized to collect data. The data collected from sensors at the nodes 102a to 102c may then be transmitted to the gateway 104 such that the wireless node network 100 forms a sensor network. The sensors included in the nodes 102a to 102c may be any suitable sensors. Suitable sensors may include, for example, one or more of a temperature sensor, an accelerometer, a light sensor, a sound sensor, a pressure sensor, a gas sensor, a pressure sensor such as, for example, a tire pressure monitoring sensor (TPMS), a motion sensor, a velocity sensor, a radio frequency identity (RFID) reader, a location sensor utilizing, for example, a global positioning system (GPS), and so forth. The type of sensor(s) included in the nodes 102a to 102c may depend on, for example, the specific application in which the wireless node network 100 is utilized. In some examples, the different nodes 102a to 102c of the wireless node network 100 may include different sensors.

In an example, the nodes 102a to 102c may include temperature sensors and may be utilized to monitor the temperature of an environment. In an example, nodes 102a to 102c and the gateway 104 of the wireless node network 100 may be installed within a shipping container to measure the temperature at various locations within the shipper container and transmit the data via, for example, a cellular network to a remote device 106, such as a server, that monitors the temperature.

Figure 2A:
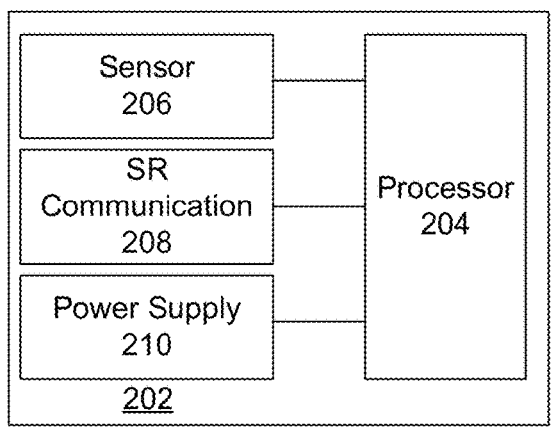
FIG. 2A is a block diagram of an node of a wireless node network in accordance with the present disclosure.
Figure 2B:
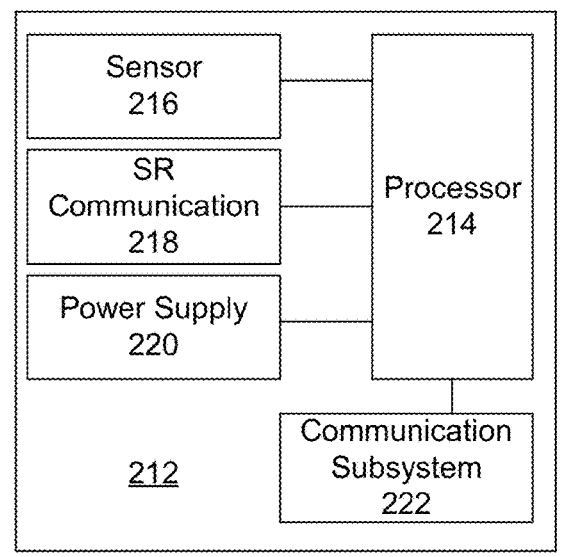
FIG. 2B is a block diagram of an example gateway of a wireless node network in accordance with the present disclosure.

FIGS. 2A and 2B are schematic diagrams of an example node 202 and an example gateway 212, respectively, that may be utilized as the nodes 102a to 102c and the gateway 104 of the wireless node network shown in FIG. 1 for forming a wireless sensor network.

The node 202 includes multiple components, such as a processor 204 that controls the overall operation of the node 202. The node 202 may include sensing functionality performed by a sensor 206. The sensor 206 may include, for example, one or more of a temperature sensor, an accelerometer, a light sensor, a sound sensor, a pressure sensor, a gas sensor, a pressure sensor such as a TPMS, a motion sensor, a velocity sensor, an RFID reader, a location sensor, and so forth. In an example, short-range (SR) communication functionality, including receiving and transmitting data with other nodes, or a gateway, or both, is performed by a SR communication subsystem 208. A power source 210, such as one or more rechargeable batteries or a port to an external power supply, powers the node 202.

Similarly, the gateway 212 includes multiple components, such as a processor 214 that controls the overall operation of the gateway 212. As described above, the gateway 212 may include all the functionality of the node 202 and therefore may include a sensor 216 that performs a sensing functionality. The sensor 216 may be any suitable sensor and may be determined by the data that is to be sensed. The sensor 216 may include, for example, one or more of a temperature sensor, an accelerometer, a light sensor, a sound sensor, a pressure sensor, a gas sensor, a pressure sensor such as a TPMS, a motion sensor, a velocity sensor, an RFID reader, a location sensor, and so forth. SR communication functionality, including receiving data from and transmitting data to nodes, or another gateway, or both, is performed by a SR communication subsystem 218. A power source 220, such as one or more rechargeable batteries or a port to an external power supply, powers the gateway 212. A communication subsystem 222 is utilized to transmit data to, and receive data from, a remote device, such as for example the remote device 106 described above, via a network, such as for example the network 108 described above.

In general, reducing the overall power consumed by the gateway and nodes of a wireless node network is desired. For example, in applications in which one or both of the gateway and the nodes are powered by a battery, only a finite amount of power available to power the device before intervention is required to, for example, replace or recharge the battery. Because wirelessly transmitting and receiving data is generally power-intensive, power consumption may be reduced by periodically transitioning the communication subsystems, such as the SR communication subsystem 208 of the node 202 and the SR communication subsystem 218 and the communication subsystem 222 of the gateway 212 in the examples shown in FIGS. 2A and 2B, between a low power state, or a "sleep state", and an "awake state". The low power state, or sleep state, may be a state in which some functionality of a communication subsystem is disabled, or the communication subsystem is powered off, such that the power consumed is reduced compared to when the communication system is operating normally. The awake state is state in which the communication subsystem is performing normal operations, i.e., when not in the low power state, or sleep state. In the awake state, the communication subsystem by be fully powered and fully operational such that the device may transmit and receive data. The period of time in which a node or a gateway is in an awake state may be referred to as the "reception time period", and the time between commencements of awake states may be referred to herein as the "interval time period".

Figure 3:
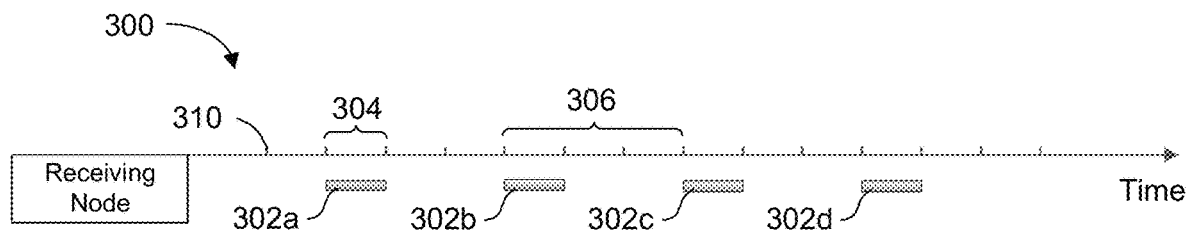
FIG. 3 is a timing diagram illustrating an example of awake and sleep states of a receiving node in accordance with the present disclosure.

FIG. 3 is a timing diagram 300 of an example of the awake states of a receiving node. The receiving node in FIG. 3 may be, for example, any of the nodes 102a to 102c or the gateway 104 of the wireless node network 100 shown in FIG. 1. The example timing diagram 300 shows four awake states 302a to 302d of the receiving node. Each awake state 302a and 302d in the example timing diagram 300 has a reception time period 304 equal to one unit of time. The units of time are represented by the ticks 310 along the time axis. The interval time period 306 between commencements of awake states, such as between the commencements of awake states 302a and 302b, in the example timing diagramming 300 is equal to three units of time.

The lengths of the reception time period 304 and the interval time period 306 shown in the example timing diagram 300 are illustrative only, and in practice any lengths for the reception time period 304 and the interval time period 306, and any ratio between the lengths of the reception time period 304 and the interval time period 306, may be utilized. In an example shown in FIG. 3, the reception time period 304 may be 100 milliseconds (ms) and the interval time period 306 may be 300 ms.

The lengths of the reception time period 304 and the interval time period 306 may be determined, at least in part, based on, for example, a power level of a battery and an estimated power consumption of the receiving node. For example, the receiving node may determine a desired time period over which the receiving node is to operate, and based on the power level of the battery and the estimated power consumption rate during the awake state, the receiving node may determine suitable lengths for the reception time period 304 and the interval time period 306 in order to optimize communication response time of sensor data in view of the power consumption due to communicating the sensor data.

Generally, in order to facilitate communication between the nodes and the gateway of a wireless node network, the nodes and the gateway may synchronize their awake states such that a node that is a "transmitting node" transmits data to a "receiving node" during the awake state of the receiving time node. Here, the receiving node may be the gateway or may be another node of the wireless node network acting as an intermediary, as described above. An issue arises when communication is desired for transmitting and receiving nodes that are not synchronized. Nodes may not be synchronized due to different reasons including, for example, the internal clock of one or both of the transmitting and receiving nodes undergoing clock drift such that the awake states of the nodes do not overlap, one of the transmitting and receiving nodes having been recently added to a wireless node network and not yet synchronized with other nodes, and one of the transmitting node and the receiving node recently restarting or rebooting such that synchronization has been lost.

Because an asynchronous node does not know when other nodes will be in an awake state, conventionally the node will continuously transmit a message, or will continuously listen for messages transmitted from other nodes, or both, in an attempt to establish a connection with another node or the gateway of the wireless node network. However, such continuous transmission of messages, or listening for messages, is power-intensive, and will reduce the battery life of the device.

The present disclosure provides for establishing an initial connection between a transmitting node, such as the nodes 102a to 102c of the wireless node network 100 shown in FIG. 1, and a receiving node, such as any other of the nodes 102a to 102c or the gateway 104 of the wireless node network 100, in a manner that utilizes less power than the conventional method of continuously transmitting or continuously listening until a connection is established, thus extending the battery life of the device compared to the convention method.

According to the present disclosure, the transmitting node transmits a message a predetermined number of times, with the time period between sequential transmissions being equal to the reception time period of the receiving node. The predetermined number of transmissions is selected such that the time period over which the transmitting node transmits the messages is at least as long as the interval time period of the receiving node. In this manner, at least one of the messages transmitted by the transmitting node is received during a time that the receiving node is awake and listening, while reducing the number of times that the message is transmitted, and therefore reducing the power consumed, compared to continuously sending the message.

Figure 4:
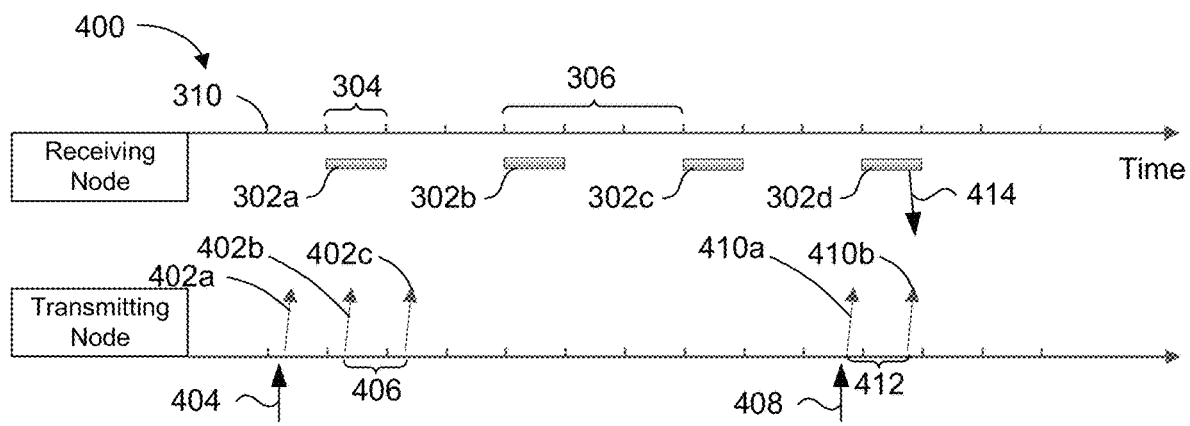
FIG. 4 is a timing diagram illustrating an example of establishing a connection between a receiving node and a transmitting node in accordance with an embodiment of the present disclosure.

FIG. 4 is a timing diagram 400 illustrating an example method for a transmitting node to establish a connection with a receiving node in accordance with the present disclosure. In the example shown, the receiving node has awake states 302a to 302d as described above with reference to FIG. 3. However, the receiving node may have any value for the reception time period 304 and the interval time period 306 other than that shown in FIG. 4.

In the example shown in FIG. 4, a transmitting node transmits a predetermine number of messages 402a to 402c in response to an event, represented by the arrow 404 in FIG. 4. The event may be any suitable trigger that causes the transmitting node to transmit data including, for example, a sensor of the transmitting node performing a measurement or a threshold number of sensors of the transmitting node performing measurements, determining that a measured value meets a threshold value or determining that the measured values from multiple sensors meet a predetermined combination of threshold values, which may be any logical function of threshold values involving, for example, one or more of "or", "and", "nor" and "nand" logical expressions, determining that the transmitting node has become asynchronous with one or more receiving nodes, restarting or rebooting the transmitting node, or adding the transmitting node to a network that includes the receiving node.

Alternatively, the transmitting node may transmit the predetermined number of messages 402a to 402c at regular intervals, in which case the event 404 may be the elapse of a predetermine amount of time since transmitting the last predetermined number of messages 402a to 402c. In an example, a timer may be started when the transmission of the predetermined number of messages 402a to 402c commenced, or ends, and the event 404 occurs when timer reaches a predetermined amount of time.

The time period 406 between transmissions of the messages, i.e., the time between transmitting messages 402a and 402b and the time between transmitting messages 402b and 402c, is approximately or substantially equal to the reception time period 304 of the receiving node. The time period 406 being "approximately equal" or "substantially equal" to the reception time period 304 means that the time period 406 is equal to the reception time period 304 up to the accuracy of the timing mechanism of the transmitting node or the receiving, or both. In an example, the setting the time period 406 to be "approximately equal" or "substantially equal" to the reception time period 304 may take into account expected or anticipated clock drift at transmitting node or the receiving node, or both. The reception time period 304 may be known to the transmitting node. For example, the value of the reception time period 304 may be stored in the transmitting node during, for example, configuration or may be received by the transmitting node during a previous message received from the receiving node.

In order to ensure that at least one of the messages 402a to 402c will be transmitting during a time that the receiving node is in the awake state, the predetermined number of transmissions is determined by the quotient of the interval time period 306 divided by the time period 406 or, alternatively, the reception time period 304. In the example shown in FIG. 4 in which the interval time period 306 is three units of time and the time period 406 and the reception time period 304 are equal to one unit of time, the predetermined number of messages 402a to 402c is three. In the event that the quotient of the interval time period 306 divided by the time period 406 or the reception time period 304 is not an integer, then the predetermined number is determined to be the quotient rounded up to the next largest positive integer value in order to ensure that at least one of the messages is transmitted while the receiving node is awake and listening.

The messages 402a to 402c may include data, such as data associated with one or more measurements performed by one or more sensors of the transmitting node, or the result of any logical function performed on the measurements such as, for example, one or more measurements meeting one or more thresholds. Alternatively, the messages 402a to 402c may be discovery frames that indicate that the transmitting node is attempting to establish a connection with a receiving node. The messages 402a to 402c may be discovery frames if, for example, the event 404 is a determination that the transmitting node has become asynchronous with the receiving node, the transmitting node has restarted or rebooted, or the transmitting node is recently added to the network and has not yet established a connection.

The messages 402a to 402c may include additional information such as, for example, an update to any of the reception time period 304, the interval time period 306, or a time until a next awake state 302 of the receiving node. In this way, the transmitting node may update or configure the awake states 302a to 302d of the receiving node, which may facilitate the transmitting node synchronizing its own awake states with the receiving node.

Alternatively, or additionally, in response to the receiving node receiving a message 402a to 402c and establishing a connection between the transmitting node and the receiving node, the receiving node and the transmitting node may exchange further messages (not shown) in order to negotiate a wake up schedule, a next awake state 302a to 302d of the receiving node, or update one or both of the reception time interval 304 and the interval time period 306, or to exchange synchronization information to synchronize the clocks of the receiving and transmitting nodes.

In some examples, the receiving node may send an acknowledgement message to the transmitting node in response to receiving one of the messages transmitted by the transmitting node. In response to the transmitting node receiving the acknowledgement message prior to transmitting the message a predetermined number of times, the transmitting node stops transmitting further messages. By stopping further transmission of messages after the acknowledgement is received, further power may be saved compared to, for example, the above-described example in which the message 402c is transmitted even through the message 402b was received by the receiving node.

For example, FIG. 4 shows a later event, represented by arrow 408, in response to which the transmitting node transmits the predetermined number of messages 410a, 410b, similar to the messages 402a to 402c transmitted in response to event 404. The event 408 may be any of the triggers described previously with respect to event 404. As with messages 402a to 402c, the time 412 between transmitting messages 410a and 410b is equal to the reception time period 304, and the predetermined number of messages is three.

As shown in the example in FIG. 4, the second message 410b is transmitted while the receiving node is in the awake state 306d, and is received by the receiving node. In response to receiving the message 410b, the receiving node transmits an acknowledgement message 414. In response to receiving the acknowledgement message 414, the receiving node stops further transmissions of the message. Thus, unlike the above described example in which the message 402c is transmitted after the previously sent message 402b was received by the receiving node, a third message is not transmitted by the transmitting node after the message 410b.

In this manner, the transmitting node may further reduce the number of messages transmitted, and thus further reduce the amount of power utilized, to establish a connection with a receiving node when an acknowledgement message is received from the receiving node.

In addition to acknowledging the receipt of the message 410b, the acknowledgement message 414 transmitted by the receiving node may include additional information. For example, the acknowledgement message may include information regarding an update to any of the reception time period 304, the interval time period 306, or a time until a next awake state 302a to 302d of the receiving node, or may include synchronization information that the transmitting node may utilize to synchronize its clock to the receiving node's clock.

In another example, the acknowledgement message transmitted by the receiving node may indicate a time at which acknowledgement message was transmitted. The transmitting node may utilize that time indicated in the acknowledgement message as a reference time for determining when the next awake state 302a to 302d will occur. For example, the transmitting node and the receiving node may utilize the time indicated in the acknowledgement message as a reference starting time such that the next awake state 302a to 302d occurs an interval time period 306 after the time indicated in the acknowledgement message.

Alternatively, the time that the transmitting node receives the acknowledgement message may be utilized to synchronize the transmitting and receiving nodes. For example, the time that the transmitting node receives the acknowledgement message may be utilized as the reference starting time. For example, the next awake state 302a to 302d of the receiving node may occur an interval time period 306 after the time the acknowledgement is received by the transmitting node. In this example, the receiving node may adjust the interval time period until the next awake state 302a to 302d to include a delay period to account for the time between when the acknowledgement message is transmitted and when it reaches the transmitting node. In another example, the reception time of the acknowledgment message could be used by the transmitting node to update the starting time of the next messages 402a to 402c. For example, the transmitting node may transmit the messages 402a to 402c an interval time period after the acknowledgement message is received at the transmitting node. In this case the transmitting node may shorten the interval time period by the delay period. By shortening the interval time period by the delay period, the transmitting node may account for the time between when the acknowledgement message is transmitted and when it is received by the transmitting node in order to synchronize the reference time utilized by the transmitting node, i.e., the time of receiving the acknowledgement message, with the reference time utilized by the receiving node, i.e., the time of transmitting the acknowledgement message.

In another example, each message of the predetermined number of messages may include an indication of the number of that message within the sequence of messages. In this way, the receiving node may determine which message in the sequence of messages was received, then adjust its next awake state to align with a middle, or near a middle, of a subsequent sequence of messages transmitted by the transmitting node.

Aligning a subsequent awake state of the receiving node with a middle of a subsequent sequence of messages from the transmitting node provides a buffer to account for drift between the clocks of the receiving and transmitting nodes that may occur between transmissions of the sequences of messages by the transmitting node.

In another example, an acknowledgment message transmitted by the receiving node in response to receiving a message from a sequence of message may include a number indicating a message in the sequence of messages to be used by the transmitting node in future communication. In this example, the transmitting node transmits a single message of the sequence, as indicated in the acknowledgement message and aligns the transmission of this message with an awake state of the receiving node based on the known interval time period 306. Alternatively, the messages of the sequence may indicate, in addition to message numbers, the specific message number in the sequence to be used by the receiving node for future communication. In this example, the receiving node may adjust the starting time of the next awake state to be centered on the message indicated in the previously received message, and the transmitting node transmitted a single message corresponding to the message having the number in the sequence as previously indicated.

Figure 5:
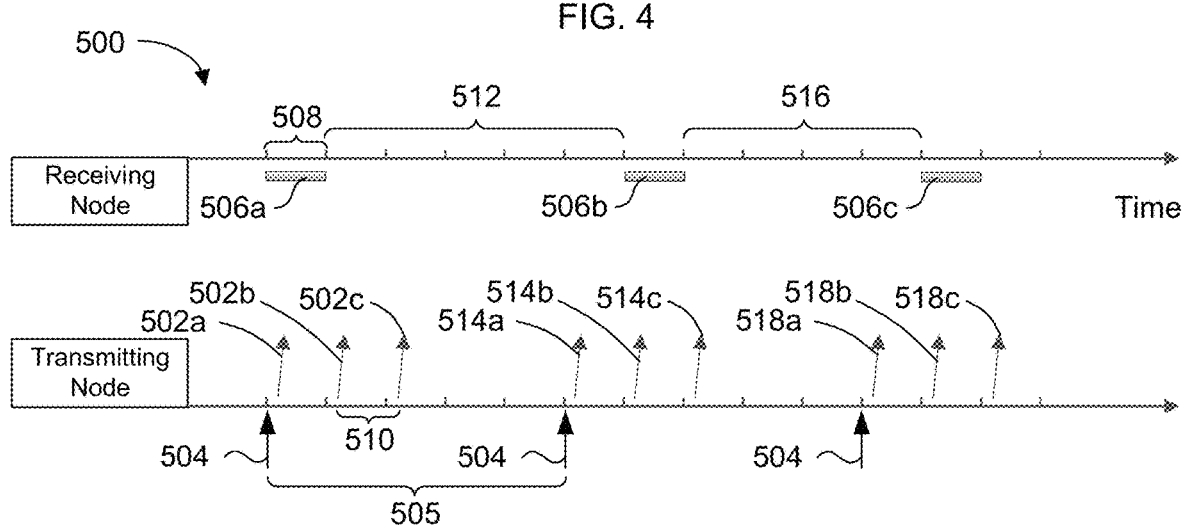
FIG. 5 is a timing diagram of an example of establishing a connection between a receiving node and a transmitting node in accordance with another embodiment of the present disclosure.

Referring to FIG. 5, an example timing diagram 500 illustrating how a receiving node may adjust a next awake state based on the number in the sequence of the message received from a transmitting node. In the example shown in FIG. 5, the transmitting node transmits a predetermined number of messages 502a to 502c in response to an event, represented by the arrows 504. In the example shown in FIG. 5, the messages 502a to 502c are transmitted at regular intervals, separated by a sequence time periods 505, such that the event 504 is the expiration of a predetermined amount of time since the commencement, or end, of a previous transmission of messages 502a to 502c. The transmitting node may be configured to transmit messages 502a to 502c at regular intervals if, for example, the transmitting node includes one or more sensors that communicate measurement results on a regular schedule.

The commencements of the transmission of the sequence of messages, such as between the messages 502a to 502c and the messages 514a to 514c, are separated by a sequence time period 505. In the example timing diagram 500 shown in FIG. 5 the commencement time period 505 is equal to five units of time. However, it will be understood by the skilled person that the sequence time period 505 may have any length.

In other examples, the sequence time period 505 between the transmissions of sequences of messages may not be at regular intervals. For example, the time period between transmission of sequence of messages 502a to 502c and the sequence of messages 514a to 514c may be different than the time period between the transmissions of the sequence of messages 514a to 514c and the sequence of messages 518a to 518c.

Similar to the messages 402a to 402c described above, each of the message 502a to 502c may include data, such as data associated with measurements, or with logical functions such as meeting a threshold, from one or more sensors included in the transmitting node, or may be discovery frames that indicate that the transmitting node is attempting to establish a connection. In addition, as previously mentioned, each of the messages 502a to 502c includes an indication of where, within the sequence of messages, that message is located. For example, message 502a may include an indication identifying the message 502a as the first, or the first of three messages, in the sequence. Similarly, messages 502b and 502c may each include an indication identifying the messages 502b, 502c as the second and third messages, respectively, of the sequence of messages. Any type of indication that identifies a message's place within the sequence of messages may be utilized.

In the example timing diagram 500 shown in FIG. 5, the receiving node has three awake states 506a to 506c. The awake states 506a to 506c have a reception time period 508 that is equal to one time unit in the example shown. The receiving node may include an interval time period, similar to the interval time period 306 described above with reference to FIG. 3. However, in the example shown in FIG. 5, in response to receiving a message 502a to 502c, the receiving node adjusts a time until a next awake state 506a to 506c to coincide, approximately, with the middle of a next sequence of messages 502a to 502c transmitted by the transmitting node.

Similar to the messages 402a to 402c, the messages 502a to 502c are separated by a time period 510 that is approximately or substantially equal to the reception time period 508 of the receiving node. The reception time period 508 may be known to the transmitting node. For example, the value of the reception time period 508 may be stored in the transmitting node during, for example, configuration or may be received by the transmitting node during, for example, a previous message received from the receiving node.

The receiving node adjusts the time until the next awake state based on the number in the sequence of the received message 502a to 502c, as well as the sequence time period 505 between transmissions of sequences of messages by the transmitting node. The sequence time period 505 may be a known value that is stored in the receiving node, either during an initial configuration of the receiving node or by receiving the sequence time period 505 in previously received message from the transmitting node.

Alternatively, or additionally, each of the messages 502a to 502c may include the value of the sequence time period 505 in order to communicate the value of the sequence time period 505 to the receiving node. In an example, a first sequence of message 502a to 502c, prior to establishing an initial connection with the receiving node, may include the value of the sequence time period 505 between sequences of message, and subsequence sequences of messages 502a to 502 after the initial connection is established may exclude the value of the sequence time period 505. In another example, the sequence time period 505 between transmissions of the sequences of messages may differ from sequence to sequence, in which the messages 502a to 502c of each sequence may set out a time until the transmission of a next sequence.

In an example, the receiving node may determine the time until a next awake state as:

Start of new Reception Time Period=(Start of previous Reception Time Period+Interval Time Period)+Reception Time Period*[(1+total)/2−n], where 'n' is the message number received, and 'total' is the total number of messages in a sequence. Note that Start of new Reception Time Period=Start of previous Reception Time+Interval Time period is the formula without time adjustment, so the quantity: Reception Time Period*[(1+total)/2−n] represents the time adjustment.

Therefore, in the example shown in FIG. 5, the first message 502a is received by the receiving node during the awake state 506a, and therefore the next awake state 506b occurs after a time 512 equal to five units of time after the awake state 506a ends, which coincides with the middle of the sequence of messages 514a to 514c. During the awake state 506b, the second message 514b of the sequence is received and therefore the next awake state 506c occurs after a time 516 equal to four units of time after the awake state 506b ends, which coincides with the middle of the sequences of messages 518a to 518c.

In an alternative embodiment, the receiving node may transmit an acknowledgment message that indicates the number of the message that was received, and the transmitting node may adjust the starting time of the next transmission of the sequence messages using the same formula as above to align the middle of the sequence of messages with the middle of the next awake state of the receiving node. Other time adjustments are possible. For example the transmitting node may adjust the starting time of the next transmission of the sequences messages to align the middle of the sequence of messages with the beginning (or nearly the beginning) of the next awake state of the receiving node. Typical transmission time of messages could also be used for the time adjustment in order to account for the time between when the messages are transmitted at the transmitting node and when the messages are received at the receiving node.

By adjusting the awake periods 506a to 506c of the receiving node to be aligned with a middle of a next sequence of messages transmitted by the transmitting node, a buffer is provided that mitigates the effects of macro-drift between the clocks of the receiving node and the transmitting node.

Additionally, as described above, the receiving node in the example shown in FIG. 5 may transmit an acknowledgement message (not shown) in response to receiving a message 502a to 502c from the transmitting node. If the transmitting node receives the acknowledgement message prior to transmitting the predetermined number of messages of the sequence, then the transmitting node may stop further transmissions of the messages such that less than the predetermined number of messages are transmitted. Further, as described above, the messages transmitting by the transmitting node, or the acknowledgement message sent by the receiving node, or both, may include additional information such as, for example, an update to either or both of the reception time period and the interval time period of the receiving node, or synchronization information for synchronize the clocks of the receiving and transmitting nodes.

Figure 6:
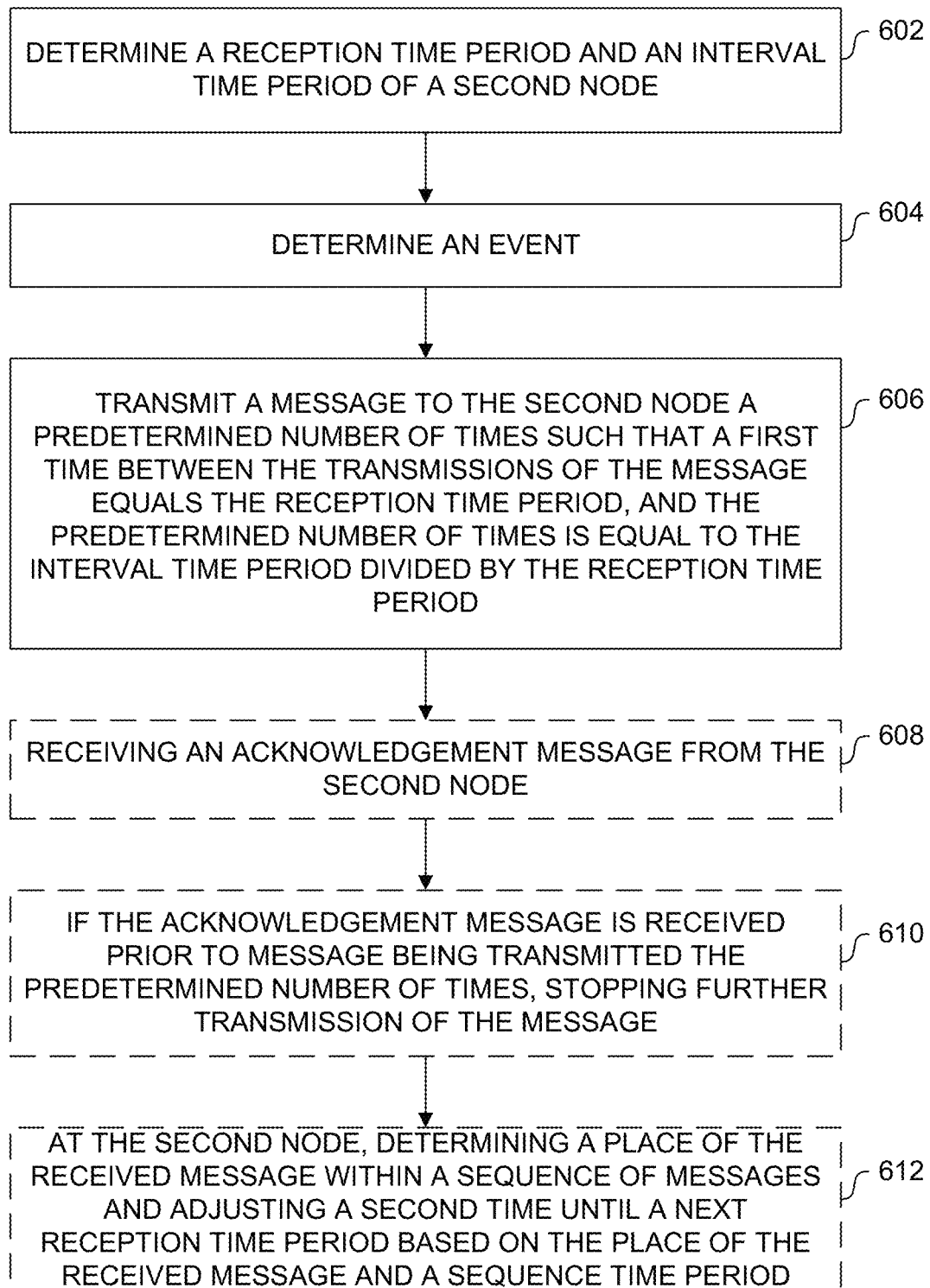
FIG. 6 is a flowchart illustrating a method for establishing a connection between a first node and a second node in accordance with another embodiment of the present disclosure.

Referring now to FIG. 6, a flow chart illustrating a method for establishing a connection between transmitting node and a receiving node is shown. The method may be carried out by software executed by a processor such as, for example, by the processor 204 of the node 202 or by the processor 214 of the gateway 212. In some embodiments, a portion of the method may be performed by a processor of a transmitting node and another portion of the method may be performed by a processor of a receiving node. Coding of software for carrying out such a method is within the scope of a person of ordinary skill in the art given the present description. The method may contain additional or fewer processes than shown and/or described, and may be performed in a different order. Computer-readable code executable by at least one processor to perform the method may be stored in a computer-readable storage medium, such as a non-transitory computer-readable medium. The computer-readable code may be incorporated into an operating system or may be incorporated into a stand-alone application.

At 602, a first node determines a reception time period and an interval time period of a second node. As described above, the reception time period is the length of time that the second node is in an awake state, and the interval time period is the time between commencements of awake states. The first node is a transmitting node, such as one of the nodes 102a to 102c, and the second node is a receiving node, such as another one of the nodes 102a to 102c or the gateway 104 described above with reference to FIG. 1. The determining at 602 may be performed by the first node accessing a stored value for the reception time period and the interval time period of the second node. The reception time period and the interval time period may be stored at the first node during configuration, or may be received by the first node in a previous message received from the second node.

At 604, the first node determines an event. The event may be any suitable trigger at the first node as described previously including, for example, one or more sensors of the first node performing a measurement or a threshold number of sensors of the transmitting node performing measurements, determining that a measured value meets a threshold value or determining that the measured values from multiple sensors meet a predetermined combination of threshold values, which may be any logical function of threshold values, determining that the first node has become asynchronous with one or more other nodes, restarting or rebooting of the first node, or adding the first node to a network that includes the second node, or determining that a sequence time period has elapsed since the commencement, or end, of a previous transmission of messages.

At 606, the first node transmits a message to the second node a predetermined number of times. The messages are transmitted such that a first time between transmissions of the message is approximately equal to the reception time period, and the predetermined number of is the quotient of the interval time period divided by the first time between transmissions of messages, or the reception time period. In the event that the quotient of the interval time period divided by the first time or the reception time period is not an integer value, the quotient is rounded up to the next largest positive integer to give the predetermined number of times that the message is transmitted.

As described above, the messages transmitted by the first node may include data such as, for example, data associated with measurements taken by one or more sensors included in the first node. Alternatively, the messages may be, for example, discovery frames indicating that the first node is attempting to establish a connection. As described previously, the messages may include additional information such as, for example, an update to any of the reception time period, the interval time period, or a time until a next awake state of the second node. In this way, the first node may update or configure the awake states of the second node, which may facilitate the first node synchronizing its own awake states with the second node.

Further, each message may include an indication of that message's place within the sequence of messages. This indication may facilitate the second node determining which message of the predetermined number of messages was received.

Optionally at 608, the first node may receive an acknowledgement message transmitted by the second node. As described above, the second node may transmit an acknowledgement message in response to receiving a message transmitted by the first node. The acknowledgement message may include an indication that acknowledges that the second node received the first node's message. In addition, the acknowledgement message transmitted by the second node may include additional information such as, for example, an update to any of the reception time period, the interval time period, or a time until a next awake state of the second node, or may include synchronization information that the first node may utilize to synchronize its clock to the second node's clock.

Optionally at 610, in response to the first node receiving the acknowledgement message prior to the first node transmitting the message a predetermined number of times, the first node stops further transmissions of the messages. As described previously, by stopping further transmissions of the message when an acknowledgement is received, the number of transmissions by the first node may be reduced, which may reduce the amount of power consumed by the first node in establishing a connection with the second node.

If the messages transmitted at 606 each include an indication of the place within the sequence of messages then optionally the second node determines a place of the received message within the sequence of messages and adjusts a time until a next awake state based on the place of the received message and a sequence time period. The second node may determine the amount of the adjustment as described above with reference to FIG. 5. As described above, the second node may determine the sequence time period based on, for example, a value stored at the second node either during initial configuration of the receiving node or from a value included in a previously received message from the first node. Alternatively, the messages transmitted from the first node at 606 may each include the value of the sequence time period.

Embodiments of the present disclosure provide establishing a connection between a transmitting node and a receiving node that utilizes less power than the transmitting node continuously transmitting a signal to establish a connection. In addition, the present disclosure provides that, in response to receiving an acknowledgement prior to transmitting the predetermined number of messages, the transmitting node stops further transmissions of the message to further reduce the power utilized to establish a connection with the receiving node. Further, the present disclosure provides that the receiving node may adjust a next awake state to align with a middle of a subsequent sequence of messages transmitted from the transmitting node in order to reduce the effects of drift of the clocks of the receiving node and the transmitting nodes.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for a first node to establish a wireless connection with a second node, the method comprising:
   determining a reception time period of the second node during which a radio of the second node is turned on to receive signals, and an interval time period between commencement of reception periods of the second node;
   determining an event;
   in response to determining the event, transmitting a message to the second node a predetermined number of times, wherein a first time between transmission of the message is substantially equal to the reception time period, and the predetermined number of times that the message is transmitted is a positive integer that is equal to a quotient of the interval time period divided by the first time, rounded up to the next larger positive integer if the quotient includes a remainder.

2. The method according to claim 1, further comprising receiving an acknowledgement message from the second node.

3. The method according to claim 2, wherein the acknowledgement message includes an update to one of the reception time period, the interval time period, and the predetermined number of times for transmitting the message.

4. The method according to claim 2, wherein one of the time of sending of the acknowledgement message by the second node and time of receiving the acknowledgement message at the first node is used by the first node as a reference starting time for the interval time period.

5. The method according to claim 2, further comprising, in response to receiving the acknowledgement message prior to transmitting the message the predetermined number of times, stopping further transmission of the message such that the message is transmitted fewer than the predetermined number of times.

6. The method according to claim 1, wherein the message includes an update to one of the reception time period, the interval time period, and the predetermined number of times for transmitting the message.

7. The method according to claim 1, wherein:
transmitting a message to the second node a predetermined number of times comprises transmitting a sequence of messages, each message of the sequence of messages includes an indicator of a place of that message in the sequence; and
determining the event comprises determining that a time since commencing transmitting a previous sequence of messages meets a sequence time period such that the sequence of messages are periodically transmitted;
the method further comprising:
in response to receiving the message transmitted by the first node, the second node determining the place of the received message in the sequence of messages and the sequence time period; and
adjusting a second time until a next reception time period of the second node based on the indicator of the place of the received message within the sequence and the sequence time period such that a middle of the next reception time period is aligned with a middle message of the sequence of messages during a subsequent transmission.

8. The method according to claim 7, wherein each message of the sequence of messages indicates the sequence time period.

9. The method according to claim 1, wherein:
the first node comprises a sensor; and
determining the event comprises at least one of the sensor making a measurement, a loss of synchronization between the first node and the second node, a reset of the node.

10. A wireless node comprising:
a first radio;
a processor in communication with the first radio and configured to:
determine a reception time period of a second node during which a second radio of the second node is turned on to receive signals, and an interval time period between commencement of reception periods of the second node;
determine an event;
in response to determining the event, transmit a message to the second node a predetermined number of times, wherein a first time between transmission of the message is substantially equal to the reception time period, and the predetermined number of times that the message is transmitted is a positive integer that is equal to a quotient of the interval time period divided by the first time, rounded up to the next larger positive integer if the quotient includes a remainder.

11. The wireless node of claim 10, wherein the processor is further configured to receive an acknowledgement message from the second node.

12. The wireless node of claim 11, wherein the acknowledgement message includes an update to one of the reception time period, the interval time period, and the predetermined number of times for transmitting the message.

13. The wireless node of claim 11, wherein one of a transmission time of sending the acknowledgement message by the second node and receiving time of receiving the acknowledgement message at the radio of the wireless node is used by the node as a reference starting time for the interval time period.

14. The wireless node of claim 11, the processor is further configured to, in response to receiving the acknowledgement message prior to transmitting all of the predetermined number of messages, stopping further transmission of the messages such that fewer than the predetermined number of messages are transmitted.

15. The wireless node of claim 10, wherein the message includes an update to one of the reception time period, the interval time period, and the predetermined number of times for transmitting the message.

16. The wireless node of claim 10, further comprising a sensor in communication with the processor, wherein determining the event comprises at least one of the sensor making a measurement, a loss of synchronization between the node and the gateway, a reset of the node.

17. A wireless system comprising:
a second node comprising:
a second radio; and
a second processor in communication with the second radio and configured to periodically turn on the second radio for a reception time period, wherein commencement of reception time periods are separated by a interval time period;
a first node comprising:
a first radio; and
a first processor in communication with the first radio and configured to:
determine the reception time period and the interval time period of the second node;
determine an event;
in response to determining the event, transmit a message to the second node a predetermined number of times, wherein a first time between transmission of the message is equal to the reception time period, and the predetermined number of times that the message is transmitted is a positive integer that is equal to a quotient of the interval time period divided by the reception time period, rounded up to the next larger positive integer if the quotient includes a remainder.

18. A non-transitory computer-readable medium having stored thereon a computer-readable code executable by a processor of a first node to cause the processor to:
- determine a reception time period of a second node during which a radio of the second node is turned on to receive signals, and an interval time period between commencement of reception periods of the second node;
- determine an event;
- in response to determining the event, transmit a message to the second node a predetermined number of times, wherein a first time between transmission of the message is substantially equal to the reception time period, and the predetermined number of times that the message is transmitted is a positive integer that is equal to a quotient of the interval time period divided by the first time, rounded up to the next larger positive integer if the quotient includes a remainder.

19. The non-transitory computer-readable medium of claim 18, wherein the computer readable code is executable by the processor to cause the processor to, in response to receiving an acknowledgement message from the second node prior to transmitting the message the predetermined number of times, stop further transmission of the message such that the message is transmitted fewer than the predetermined number of times.

20. The non-transitory computer-readable medium of claim 18, wherein the message includes an update to one of the reception time period, the interval time period, and the predetermined number of times for transmitting the message.

* * * * *